(12) United States Patent
Kolze et al.

(10) Patent No.: US 6,798,854 B2
(45) Date of Patent: Sep. 28, 2004

(54) SYSTEM AND METHOD FOR CANCELING INTERFERENCE IN A COMMUNICATION SYSTEM

(75) Inventors: Thomas J. Kolze, Phoenix, AZ (US); Bruce J. Currivan, Irvine, CA (US); Jonathan S. Min, Buena Park, CA (US); Eric Ojard, San Francisco, CA (US); James Chi Thi, Irvine, CA (US); Daniel Howard, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 311 days.

(21) Appl. No.: 09/878,730

(22) Filed: Jun. 11, 2001

(65) Prior Publication Data

US 2002/0094044 A1 Jul. 18, 2002

Related U.S. Application Data

(60) Provisional application No. 60/262,380, filed on Jan. 16, 2001.

(51) Int. Cl.[7] .................................................. H04B 1/10
(52) U.S. Cl. ....................................................... 375/350
(58) Field of Search ................................. 375/346, 350, 375/285; 455/296, 307; 327/553, 556

(56) References Cited

U.S. PATENT DOCUMENTS 5,278,870 A * 1/1994 Mays et al. ................. 375/346
6,014,412 A * 1/2000 Wiese et al. ................. 375/346
6,622,044 B2 * 9/2003 Bange et al. ................. 607/27

* cited by examiner

Primary Examiner—Stephen Chin
Assistant Examiner—Kevin Kim
(74) Attorney, Agent, or Firm—Bruce Garlick

(57) ABSTRACT

A filter settings generation operation includes sampling a communication channel to produce a sampled signal. The sampled signal is spectrally characterized across a frequency band of interest to produce a spectral characterization of the sampled signal. This spectral characterization may not include a signal of interest. The spectral characterization is then modified to produce a modified spectral characterization. Filter settings are then generated based upon the modified spectral characterization. Finally, the communication channel is filtered using the filter settings when the signal of interest is present on the communication channel. In modifying the spectral characterization, pluralities of spectral characteristics of the spectral characterization are independently modified to produce the modified spectral characterization. Modifications to the spectral characterization may be performed in the frequency domain and/or the time domain. One particular spectral modification that is performed is raising of the noise floor of the spectral characterization to meet a budgeted signal-to-noise ratio. Other spectral modifications include modifying spectral components corresponding to an expected interfering signal. In modifying these spectral characterizations, spectral components corresponding to a plurality of expected interfering signals may be modified.

49 Claims, 9 Drawing Sheets

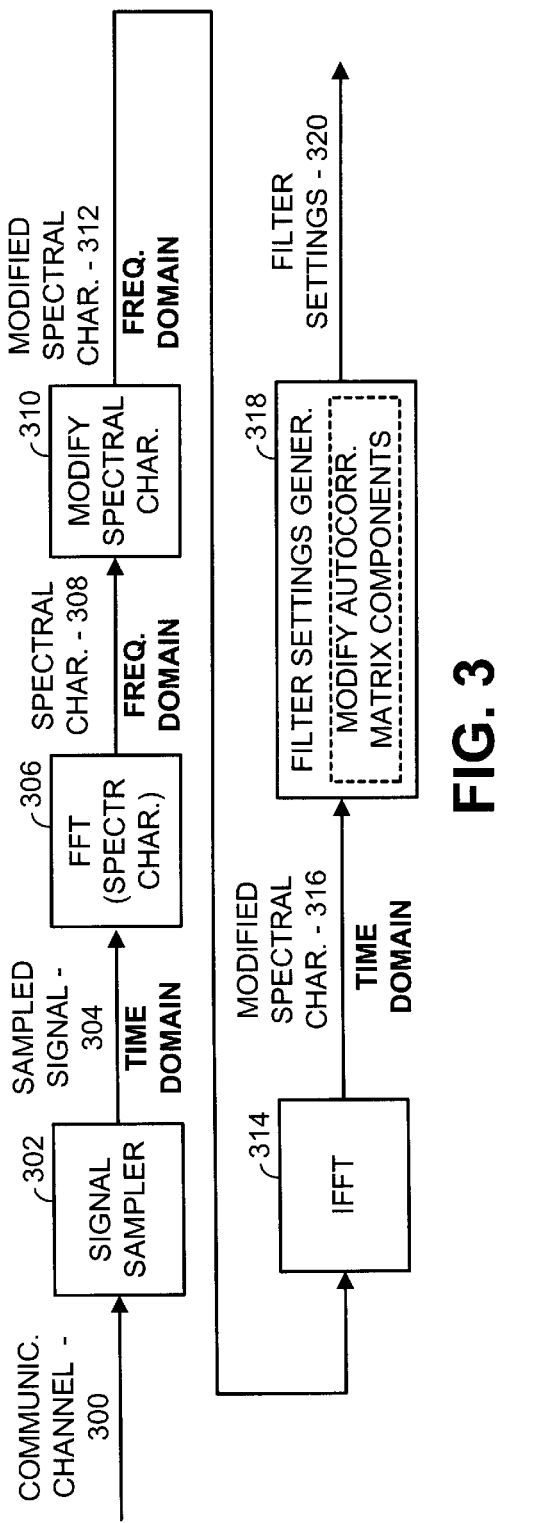
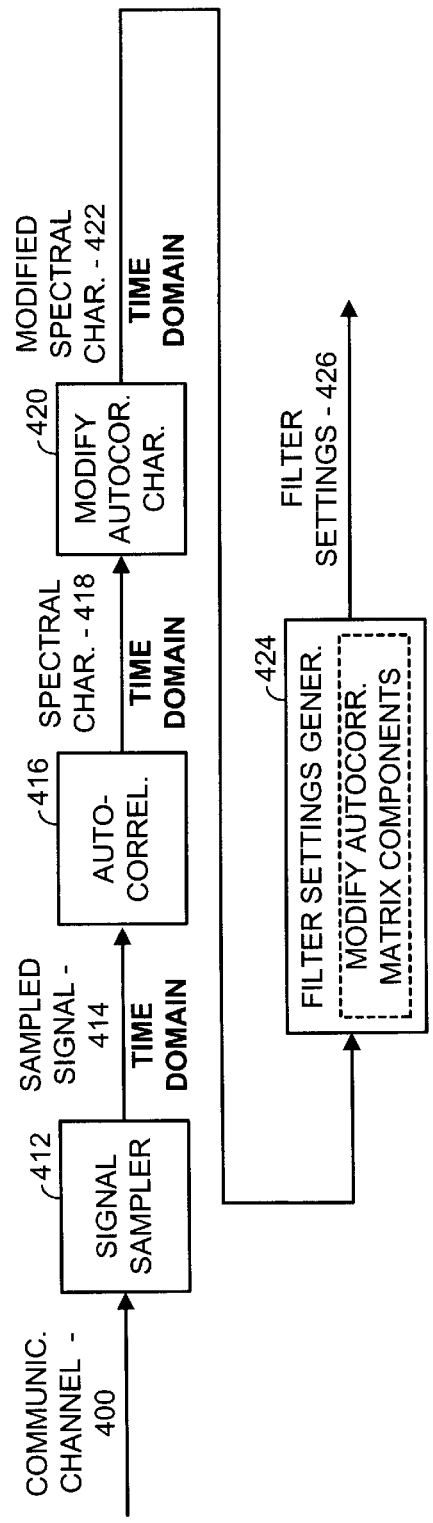
FIG. 3
FIG. 4

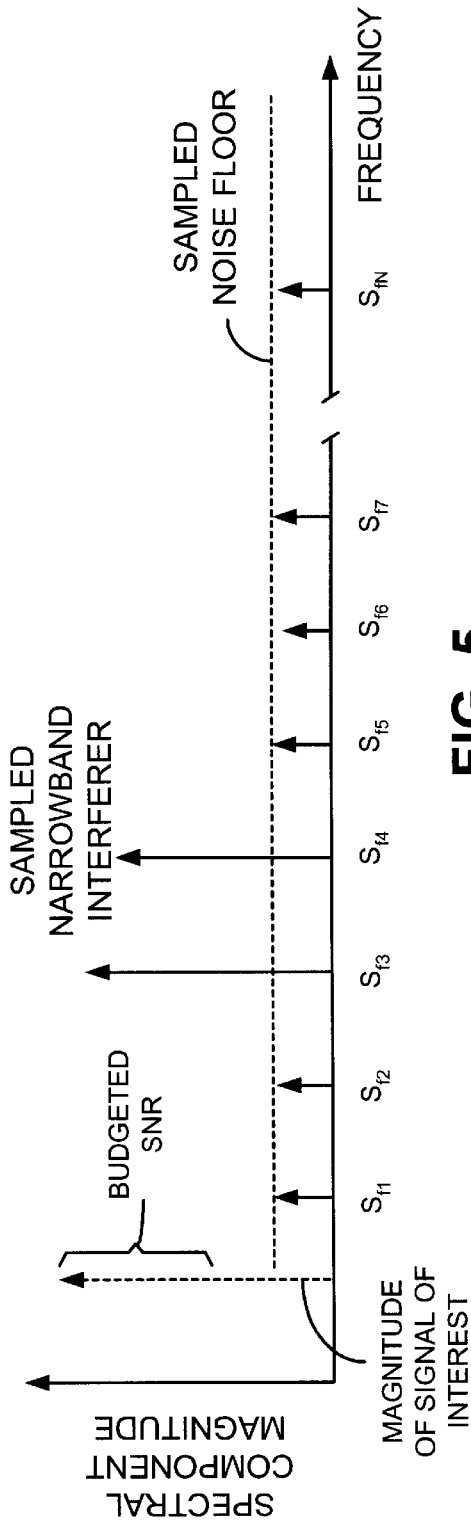
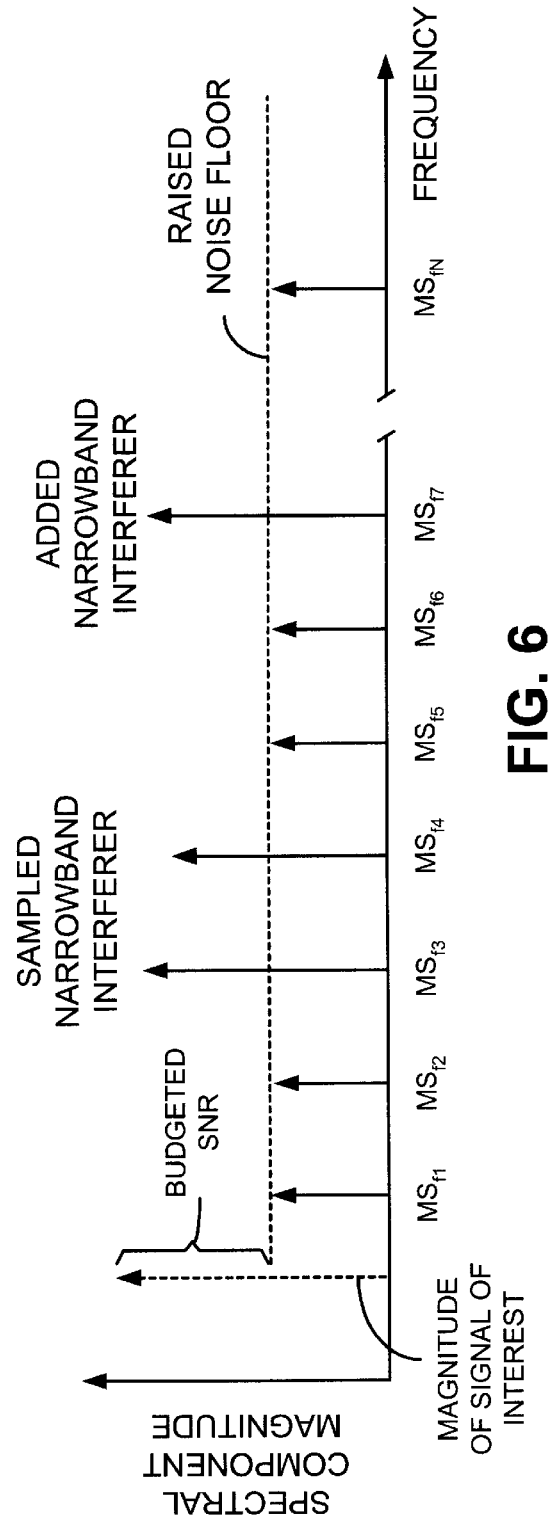

| MODE | ACTION AT THE FREQUENCY BIN |
|---|---|
| 1 | SELECT INPUT SPECTRUM AND IGNORE MASK |
| 2 | SELECT MASK AND IGNORE INPUT SPECTRUM |
| 3 | SELECT INPUT SPECTRUM OR MASK, WHICHEVER IS GREATER (MAX) |
| 4 | TAKE dB SUM OF INPUT SPECTRUM AND MASK |

SYSTEM AND METHOD FOR CANCELING INTERFERENCE IN A COMMUNICATION SYSTEM

CROSS REFERENCE TO RELATED APPLICATION

This application claims priority to U.S. Provisional Application Ser. No. 60/262,380, filed Jan. 16, 2001, the disclosure of which is incorporated herein by reference.

FIELD OF THE INVENTION

The present invention relates generally to communication systems, and more particularly to interference mitigation in communication systems.

BACKGROUND OF THE INVENTION

The structure and operation of high-speed data communication systems are generally known. Such high-speed data communication systems employ various media and/or wireless links to support the transmission of high-speed data communications. Particular embodiments of high-speed communication systems include, for example, cable modem systems, home networking systems, wired local area networks, wired wide area networks, wireless local area networks, satellite networks, etc. Each of these high-speed data communication systems has some unique operational characteristics. Further, some of these high-speed data communication systems share similar operational drawbacks. Home networking systems and cable modem systems, for example, are both subject to interfering signals that are coupled on media that carry communication signals.

Cable modem systems, and more generally, cable telecommunication systems include set-top boxes and residential gateways that are in combination capable of currently providing data rates as high as 56 Mbps, and are thus suitable for high-speed file transfer, video teleconferencing and pay-per-view television. These cable telecommunication systems may simultaneously provide high-speed Internet access, digital television (such as pay-per-view) and digital telephony. Such a system is shown and described in U.S. patent application Ser. No. 09/710,238 (Attorney Docket No. 34690), entitled "Pre-Equalization Technique for Upstream Communication Between Cable Modem and Headend", filed on Nov. 9, 2000, the disclosure of which is expressly incorporated by reference.

Cable modems are used in a shared access environment in which subscribers compete for bandwidth that is supported by shared coaxial cables. During normal operations, sufficient bandwidth is available across the shared coaxial cables to service a large number of subscribers, with each subscriber being serviced at a high data rate. Thus, during normal operations, each subscriber is provided a data rate that is sufficient to service uninterrupted video teleconferencing, pay-per-view television, and other high bandwidth services.

Intermittent, narrowband interfering signals may, from time to time, interfere with wideband communication signals, e.g., upstream Data-Over-Cable Service Interface Specification (DOCSIS) transmissions ("desired signals"). These intermittent narrowband interfering signals unintentionally couple to the shared coaxial cables via deficiencies in shielding and/or other coupling paths. With these interfering signals present, the data rate that is supportable on the coaxial cables is reduced. In some cases, depending upon the strength and band of the interfering signals, the supportable bandwidth is reduced by a significant level.

Conventionally, when an interfering signal is present, an adaptive cancellation filter is employed by each cable modem receiver to cancel the interfering signal by adaptively placing a filtering notch or null at the frequency of the interfering signal. When the interfering signal becomes absent, the conventional adaptive cancellation filter continues to adapt and removes the filtering notch. If the interfering signal reappears, the adaptive cancellation filter again adapts to null the interfering signal. Thus, when the interfering signal first reappears, the cancellation filter cannot fully compensate for the interfering signal. Because many interfering signals are intermittent, the presence of these intermittent signals reduces the bandwidth that is supportable upon the coaxial media during the time period required for the cancellation filter to adapt. Further, because the interfering signals oftentimes vary in strength while present, the adaptive cancellation filter most often times does not fully remove the interfering signal.

Overlapping adjacent channel signals cause another source of interference for the desired signal because they often produce interfering signals in the band of the desired signal. For example, a TDMA signal that resides in an adjacent channel and that turns on and off may have side lobes that overlap and interfere with the desired signal. When the interfering signal is present, the conventional adaptive cancellation filter places a notch or null at the frequency band of the interfering signal. When the interfering signal is absent, the cancellation filter adapts to removes the notch. The precise amount of interference in the desired signal caused by the adjacent channel signals may vary with data content in the adjacent channel.

Thus, in both the case of the narrowband interferer and the adjacent channel interferer, the interfering signal(s) varies over time. For this reason, an optimal or near-optimal solution may be found only for the average interfering strength of the interfering signal(s), but not for the peak(s) of the interfering signal(s). In many operational conditions, typical fluctuations in the strength of interfering signals cause conventional cancellation filters to provide insufficient cancellation. Resultantly, overall bandwidth that could be provided by the supporting communication system on the particular shared media is significantly reduced.

Therefore, there is a need in the art for a filtering system and associated operations that cancel interfering signals so that throughput is maximized.

SUMMARY OF THE INVENTION

The present invention specifically addresses and alleviates the above-mentioned deficiencies associated with the prior art to efficiently filter a communication channel to remove narrow band interfering signals. According to the present invention, a communication channel is sampled to produce a sampled signal. Then, the sampled signal is spectrally characterized across a frequency band of interest to produce a spectral characterization of the sampled signal. This spectral characterization may not include the signal of interest. The spectral characterization is then modified to produce a modified spectral characterization. Filter settings are then generated based upon the modified spectral characterization. Finally, the communication channel is filtered using the filter settings when the signal of interest is present on the communication channel.

Various operations are employed to modify the spectral characterization to produce the modified spectral characterization. In most cases, a plurality of spectral characteristics of the spectral characterization are independently modified to produce the modified spectral characterization. Modifications to the spectral characterization may be performed in the frequency domain and/or the time domain. One particular spectral modification that is performed is raising of the noise floor of the spectral characterization to meet a budgeted signal-to-noise ratio.

Other spectral modifications include modifying spectral components corresponding to an expected interfering signal. In modifying these spectral characterizations, spectral components corresponding to a plurality of expected interfering signals may be modified. In obtaining information to perform this spectral modification, spectral components of prior sampled signals may be employed. For example, an interfering signal may be intermittent so that it is not present in the current sampled signal but was present in prior sampled signals. Since overall system performance may be enhanced when the filter compensates for this interfering signal even when it is not present, in modifying the spectral characterization of the sampled signal to produce the modified spectral characterization, the presence of an interfering signal in a prior sampled signal may be weighted more heavily than the absence of the interfering signal in the current sampled signal.

The communication channel may be sampled with or without the presence of the signal of interest. However, when the signal of interest is present on the communication channel during the sampling interval, the signal of interest must be removed from the sampled signal. Further, when the total spectral density of the sampled signal exceeds a threshold value, the sampled signal may be discarded as invalid.

Because the filtering operations of the present invention adapt to time varying interfering signals in an adaptive fashion, more efficient filtering operations are performed. For example, by raising the noise floor of the spectral characterization, budgeted SNR design constraints may be met with minimal filter tap magnitudes. Further, by enabling the introduction of known interferers into the modified spectral characterization, the filtering operations will compensate for interfering signals immediately when they appear, not after a learning period of the prior filtering operations. Because of these benefits, among others, greater system throughput is realized.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

FIG. 3 is a block diagram illustrating operations employed to generate filter settings corresponding to a first embodiment of FIG. 2;

FIG. 4 is a block diagram illustrating operations employed to generate filter settings corresponding to a second embodiment of FIG. 2;

FIG. 5 is a graph illustrating the spectral characteristics of a sampled signal according to the present invention;

FIG. 6 is a graph illustrating the modified spectral characteristics of a sampled signal according to the present invention;

DETAILED DESCRIPTION OF THE INVENTION

Figure 1:
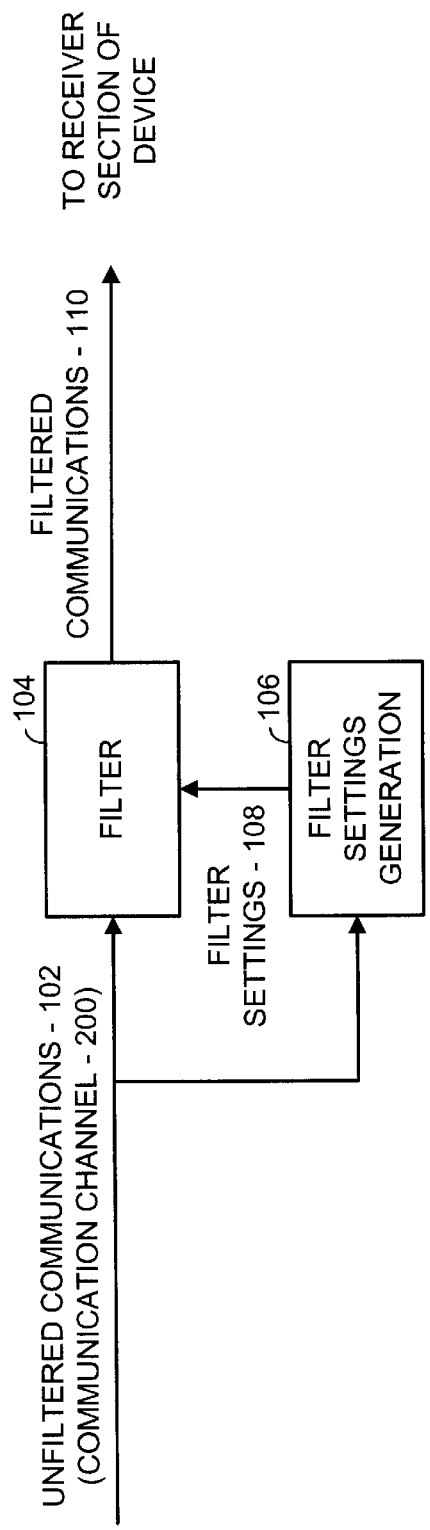
FIG. 1 is a simplified block diagram illustrating a first embodiment of a narrow band interference cancellation filter (ICF) used in accordance with the principles of the present invention.

FIG. 1 is a simplified block diagram illustrating a first embodiment of a narrow band interference cancellation filter (ICF) used in accordance with the principles of the present invention. According to the present invention, incoming unfiltered communications 102 are received on a communication channel and filtered using filter 104 to produce filtered communications 110. Filter settings 108, generated by filter settings generation block 106, when applied to filter 104 remove narrow band interfering signals from the communication channel to produce the filtered communications 110. Thus, during normal operations, the filtered communications 110 are provided to the receiver section of a device in which the ICF resides. Because of the filtering operations of the present invention, the receiver is better able to operate on a signal of interest (desired signal) contained in the filtered communications 110 to remove data contained therein.

Figure 2:
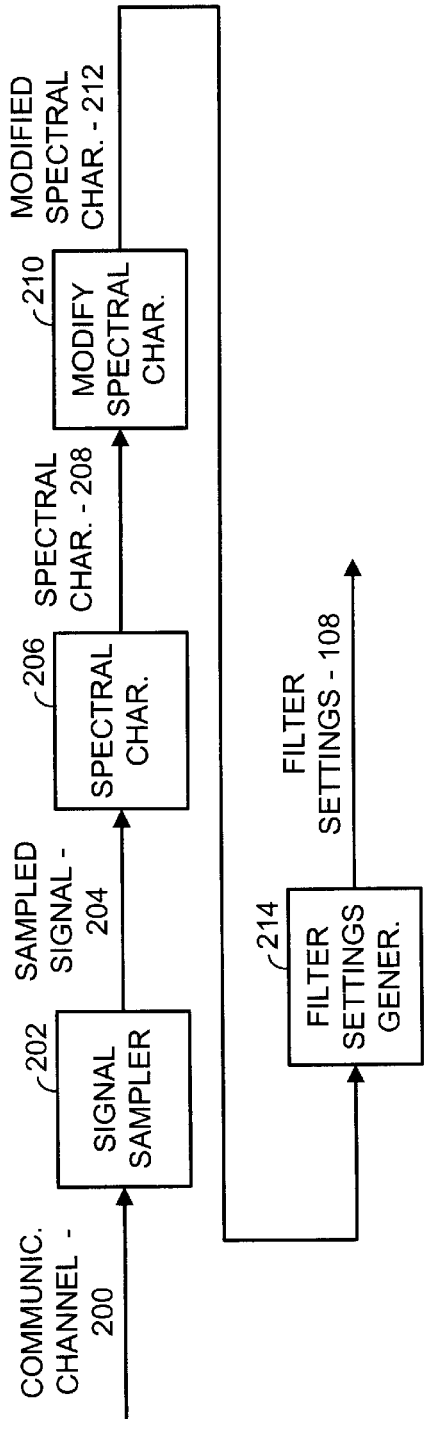
FIG. 2 is a simplified block diagram illustrating a set of operations employed to generate the filter settings of FIG. 1.

FIG. 2 is a simplified block diagram illustrating a set of operations employed to generate the filter settings 108 of FIG. 1. In operation, the filter settings generation block 106 first samples the communication channel 200 to produce a sampled signal 204. Sampling operations are performed by the signal sampler 202 of FIG. 2. In the particular embodiment of operation illustrated, the communication channel 200 is sampled when a signal of interest (desired signal) is not present on the communication channel 200. However, in other operational embodiments, the signal of interest is present on the communication channel 200 during sampling but all or a portion of the signal of interest is removed from the sampled signal 204 by the signal sampler 202, taking advantage of a known preamble, for example.

The sampled signal 204 is then spectrally characterized across a frequency band of interest by spectral characterization block 206 to produce a spectral characterization 208 of the sampled signal 204. Because the sampled signal 204 did not include the signal of interest, the spectral characterization 208 also does not include the signal of interest 212. Thus, the sampled signal 204 includes noise that is present during the sampling period and includes interfering signal(s) if present. The filter settings generation block 106 operates periodically to generate new filter settings 108. Thus, during some sample periods, interfering signals are present while during other sample periods, interfering signals are not present. Therefore, for any given operation of the filter settings generation block, the spectral characteristics 208 may or may not include interfering signals. However, the spectral characteristics 208 will always include noise at some level.

Next, the spectral characteristics 208 of the sampled signal 204 are modified to produce a modified spectral characterization 212 by modify spectral characterization block 210. The modifications performed by modify spectral characterization block 210 to produce the modified spectral characterization 212 are numerous and varied. These operations include raising the noise floor of the spectral characterization 208, introducing spectral characteristics into the spectral characterization 208 that relate to previously present interfering signals, introducing spectral characteristics of expected interfering signals into the spectral characterization 208 that are expected but that have not recently been present (or at all been present), and other preemptive modifications.

A filter settings generation block 214 then generates filter settings 108 based upon the modified spectral characterization 212. Finally, the filter settings 108 are applied to the filter 104 for subsequent filtering of the communication channel when the signal of interest is present on the communication channel.

FIG. 3 is a block diagram illustrating operations employed to generate filter settings corresponding to a first embodiment of FIG. 2. As shown in FIG. 2, the communication channel is sampled using signal sampler 302 to produce a sampled signal 304 in the time domain. The sampled signal 304 is produced by the signal sampler 302 so that a signal of interest is not present (or substantially attenuated). The sampled signal 304 is a digital representation of the analog signal that is present on the communication channel 300 during the sampling interval.

A Fast Fourier Transform (FFT) is then performed upon the sampled signal 304 by spectral characterization block 306. A Hanning or other window is used to remove sensitivity to frequency location. The FFT operation (as well as most/all other of the operations upon the digital data) is performed using a Digital Signal Processor (DSP) or another computing device resident in the device performing the operations of the present invention. The spectral characterization block 306 performing the FFT operation therefore produces a spectral characterization 308 of the sampled signal. Because no signal of interest (desired signal) was present in the sampled signal 304, no spectral components of the signal of interest (desired signal) are present in the spectral characterization 308.

As is illustrated, the spectral characterization block 306 of FIG. 3 receives input in the time domain but produces output in the frequency domain. The concepts of transformation from the time domain to the frequency domain and the transformation from the frequency domain to the time domain are well known and will be described herein only as they relate to the present invention. Modification of the spectral components of the sampled signal may be performed in the time domain and/or the frequency domain. In the embodiment of FIG. 3, modification of spectral components is first performed in the frequency domain by modify spectral characterization block 310 to produce a modified spectral characterization 312. Such modification of the spectral components by the modify spectral characterization block 310 may include raising the noise floor of the spectral characterization 308, introducing spectral characteristics that relate to previously present interfering signals, and introducing spectral characteristics of expected interfering signals, among others.

The modified spectral characterization 312 is then converted back to the time domain as modified spectral characterization 316 via Inverse Fast Fourier Transform (IFFT). In the time domain, the modified spectral characterization 316 is contained in an autocorrelation matrix, which is applied to a filter settings generation block 318 that produces the filter settings 320. Note that during the generation of the filter settings, the modified spectral characterization 316 of the sampled signal may be further modified. In the time domain, the modified spectral characterization 316 is further modified by modifying the components of the corresponding autocorrelation matrix. These further modifications may be required to generate filter settings that meet a set of filter settings criteria. Such further modification (as will be described further with reference to FIGS. 7B and 8) may include further raising the noise floor of the spectrum corresponding to the modified autocorrelation characterization 316 and using prior filter settings in order to generate a satisfactory set of filter settings.

FIG. 4 is a block diagram illustrating operations employed to generate filter settings corresponding to a second embodiment of FIG. 2. As contrasted to the operations of FIG. 3, the operations of FIG. 4 are performed fully in the time domain. As shown in FIG. 3, the communication channel is sampled using signal sampler 412 to produce a sampled signal 414 in the time domain that either does not contain the signal of interest or from which the signal of interest was substantially attenuated. This sampled signal 414 is then presented to autocorrelation block 416 that determines the autocorrelation function of the sampled signal 414. The result of this operation is the generation of a spectral characterization 418 in the time domain of the sampled signal 414 in the form of an autocorrelation matrix.

The modify autocorrelation characterization block 420 operates on the spectral characterization 418 of the sampled signal 414 in the time domain by altering the coefficients of the autocorrelation matrix. The altered autocorrelation matrix therefore represents the modified spectral characterization 422 that is in the time domain. Modification of the spectral components of the spectral characterization 418 by the modify autocorrelation characterization block 420 may include raising the noise floor of the spectral characterization 418, introducing spectral characteristics that relate to previously present interfering signals, and introducing spectral characteristics of expected interfering signals that have not yet been present, among others. The noise floor of the modified spectral characterization 418 of the sampled signal 414 may be changed by altering the diagonal components of the autocorrelation matrix. Other spectral characteristics of the spectral characterization 418 of the sampled signal 414 may be changed by altering the off-diagonal components of the autocorrelation matrix.

The modified spectral characterization 422 is applied to a filter settings generation block 424 that produces the filter settings 426. Note that during the generation of the filter settings, the modified spectral characterization 422 of the sampled signal may be further modified. Such further modification may be required to generate filter settings that meet a set of filter settings criteria. Such further modification (as will be described further with reference to FIGS. 7B and 8) may include further raising the noise floor of the modified spectral characterization 422 and using prior filter settings in order to generate a satisfactory set of filter settings. Spectral characteristics of the modified spectral characterization 422 are further altered in the filter settings generation block 424 by modifying the components of the corresponding autocorrelation matrix.

FIG. 5 is a graph illustrating the spectral characteristics of a sampled signal according to the present invention. The representation of the sampled signal of FIG. 5 is in the frequency domain, e.g., spectral characterization 308 of FIG. 3. In one embodiment of the present invention, the spectral characterization will include 256 unique "frequency bins" within a frequency band of interest. Each frequency bin corresponds to a unique frequency, includes a magnitude component and may include an angular component. In a particular implementation of the present invention, the represented magnitude represents the power of the sampled signal, e.g., signal magnitude squared, without an angular component. Further, in the particular embodiment, the represented magnitude is expressed in a logarithmic scale, e.g., log base 2, for each frequency bin.

Thus, in the graph of FIG. 5, the frequency bins include components for 1, 2, ..., N, where N=256. The spectral characterization of the sampled signal includes a spectral component for each frequency bin, denoted as $S_{f1}$, $S_{f2}$, ... , $S_{fN}$. Because no signal of interest (desired signal) is present in the spectral characterization of FIG. 5, each spectral component corresponds to either noise or a combination of noise and a sampled narrowband interferer. For example, spectral components $S_{f3}$ and $S_{f4}$ correspond to a particular narrowband interferer that was present on the communication channel during the sampling interval. Other spectral components corresponding to interfering signals that are present during the sampling interval may also be present but are not shown in the example of FIG. 5.

Also illustrated in FIG. 5 is a representation of a noise floor for the spectral characterization. The level of the noise floor may be calculated as an average of spectral components that do not exceed a threshold, an average of all spectral components, a weighted average of all or a portion of the spectral components, or in another manner that accurately represents the noise floor for the sampled signal.

Also illustrated in FIG. 5 is the concept of a budgeted signal to noise ratio (SNR) for the communication channel. As is generally known, in the design of a receiver, a minimum SNR is desired for satisfactory demodulation operations to be performed. This minimum SNR is referred to herein as the budgeted SNR. Based upon this budgeted SNR and an estimate of the signal strength of the signal of interest (desired signal) that will be received by the receiver, an estimated level of an acceptable noise floor is determined. As is illustrated in FIG. 5, the sampled noise floor lies below the difference between the magnitude of the signal of interest (desired signal) and the budgeted SNR. Thus, in the example of FIG. 5, the receiver could operate within its design criteria even if the noise floor of the communication was higher than the sampled noise floor.

FIG. 6 is a graph illustrating the modified spectral characteristics of a sampled signal according to the present invention. As compared to the spectral characterization of FIG. 5, the modified spectral characterization includes a raised noise floor and an added narrowband interferer at frequency bin f7. In raising the noise floor, the magnitude of some, most, or all of the spectral components is raised until the raised noise floor corresponds to the difference between the expected magnitude of the signal of interest (desired signal) and the budgeted SNR. In adding a spectral component of the added narrowband interferer, the magnitude of one or more spectral components corresponding to the added narrowband interferer is increased to a desired magnitude. The modified spectral components are then used to generate the filter settings.

The spectral component modifications illustrated with reference to FIGS. 5 and 6 are performed in the frequency domain. However, similar operations may also be performed in the time domain by operating upon the autocorrelation matrix, as was previously discussed. Further, according to one particular embodiment of the present invention (that will be discussed with reference to FIGS. 7A, 7B, and 8) the spectral characterization is first modified in the frequency domain and then, depending upon whether such modification is required to meet filter design criteria, additional spectral modifications are made in the time domain.

Figure 7A:
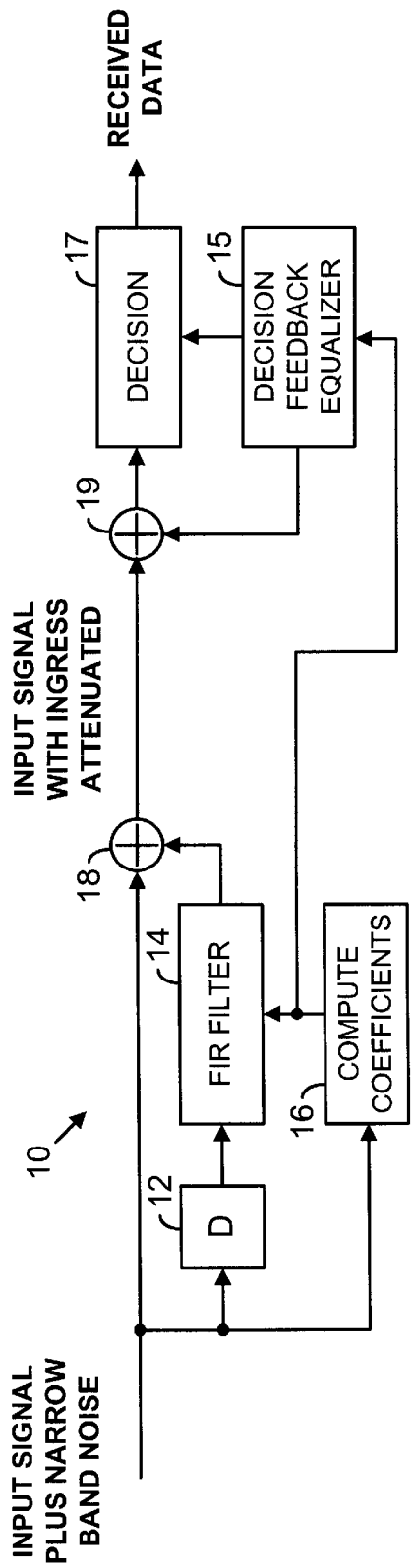
FIG. 7A is a simplified block diagram illustrating an embodiment of a narrow band interference cancellation filter used in accordance with the principles of the present invention.

FIG. 7A is a simplified block diagram illustrating an embodiment of a narrow band interference cancellation filter used in accordance with the principles of the present invention. In FIG. 7A, a narrow band interference cancellation filter (ICF) 10 is operative to null out narrowband interference such as ingress and/or adjacent channel interference from an input signal. In the embodiment, ICF filter 10 generates a set of adaptive, predictive filter tap weights, based on a weight computation algorithm. In the embodiment, the ICF tap weights are computed during idle slots when interference is present, but no desired signal is present.

ICF filter 10 includes a delay element 12 to provide a unit delay of one sample, an adjustable finite impulse response (FIR) filter 14, and a tap weight computation circuit 16. An input signal having narrow band interference such as ingress or adjacent channel interference is received by ICF filter 10. The input signal is introduced to delay element 12, tap weight computation circuit 16, and a summing junction 18. Circuit 16 computes tap weights, which adjust the pass band characteristics of FIR filter 14 to null out, i.e., cancel, narrow band interference appearing in the input signal. For example, if a noise spike or an intermittent carrier from another channel appears in the signal, FIR filter 14 would be adjusted to have a notch at the frequency of the interference appearing in the input signal. The output of delay element 12 is coupled to FIR filter 14. FIR filter 14 filters the input signal based on the tap weights. In a typical embodiment of the invention, FIR filter 14 might have 16 taps. The output of FIR filter 14 is combined with the input signal in summing junction 18. The output of summing junction 18 is thus equal to the input signal with the interference attenuated (or nulled).

The signal distortion caused by the ICF 10 may be compensated by a decision feedback equalizer (DFE) 15 in combination with a summing node 19. The filter taps generated by the compute coefficients block 16 are also provided to the DFE 15. The DFE 15 receives the filter taps and, based upon the filter taps, generates a compensation output that is summed with the input signal with ingress attenuated at summing node 19. The output of the summing node 19 is then received by a decision block 17, which also receives input from the DFE 15. The decision block 17, based upon the input from the summing node 19 and the DFE 15, produces received data.

Figure 7B:
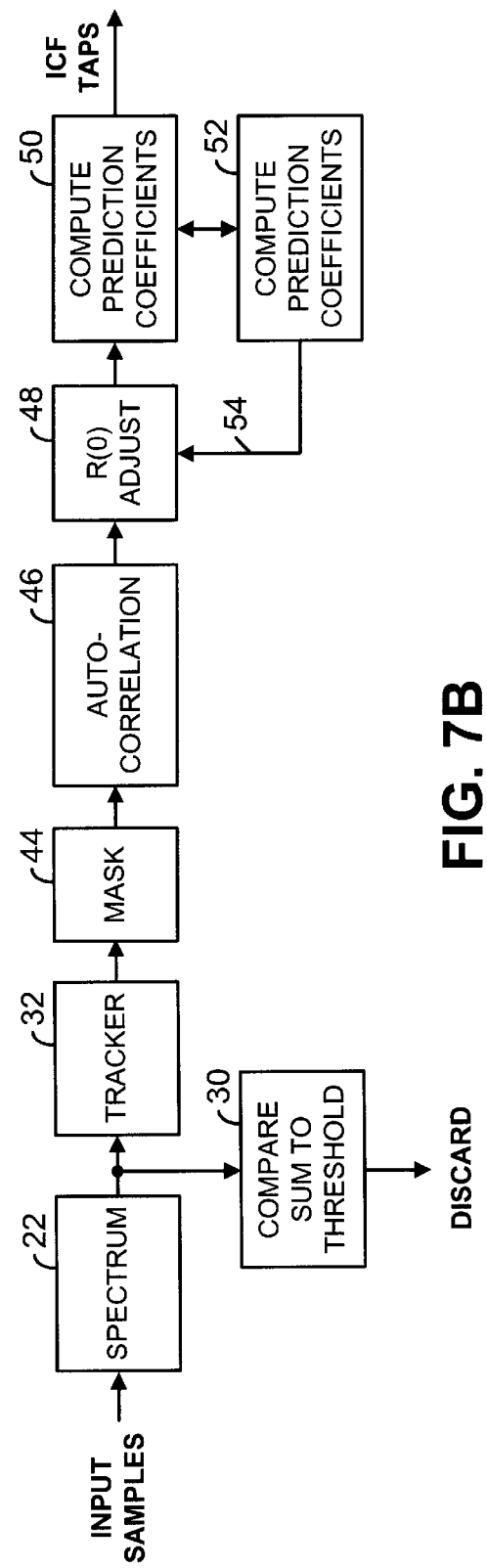
FIG. 7B is a block diagram of a filter weight computation algorithm for the ICF of FIG. 7A.

In FIG. 7B, the functional elements of the algorithm represented as tap weight computation circuit 16 of FIG. 7A are shown in more detail. The input signal from FIG. 7A, which includes narrow band interference such as ingress and adjacent channel disturbances, is processed as shown in FIG. 7B. First, the narrow band interference is separated from the signal. In the embodiment, a block of 256 complex samples is taken from the communication channel during idle Time Division Multiple Access (TDMA) slots, thereby representing the narrowband interference. For example, as illustrated in co-pending application Ser. No. 09/710,238, filed on Nov. 9, 2000, the MAC at a cable modem termination system could create idle slots that insure there are time intervals in which no cable modems are transmitting an upstream signal. The samples are taken during these idle slots. In another embodiment, the interference is separated from the signal by estimating the signal (or a known portion thereof, such as a preamble) and subtracting the estimated signal from the input signal, leaving only the narrow band interference. In yet another embodiment, periods of no signal on the communication channel are sensed by a threshold detector or SNR detector, and the samples are only taken during such periods. In any case, time intervals containing narrow band interference without signal are produced for sampling and processing by circuit 16.

Preferably, the input samples are converted to the frequency domain using a fast Fourier transform (FFT) block 22, which takes a complex fast Fourier transform of the input samples. Working in the frequency domain facilitates a number of the operations described below such as verifying the narrow band content, tracking the changes in the interference with different time constants, and frequency masking. However, the tap values could be computed in the time domain using autocorrelation properties in another embodiment (as described in FIG. 4). In the embodiment of FIG. 7B, a 256-point windowed FFT of the input samples is taken to produce a representation of the sampled spectrum without signal, i.e. the spectrum of the narrow band noise only. Typically, as many as 100 such blocks of samples are captured during a time interval T (typically, T=1 second), so as to permit rapid tracking of time varying narrow band interference.

The sampled spectrum without signal comprises 256 frequency bins each having complex values that represent the energy in the frequency band of the bin. These frequency bins were illustrated generally with reference to FIGS. 5 and 6. Preferably, the complex values of each bin are converted to the absolute value of the result that is transformed to the logarithm of the absolute value, thus providing an estimate of the log power spectral density (PSD) of the interference.

To verify the narrow band content of the sampled energy, the output of block 22 is summed over all the frequency bins comprising the log spectrum, and this sum is compared to a threshold value, as represented by a block 30. If the sum exceeds the threshold value, then that spectrum is discarded, and no further processing is performed during that particular time slot. The spectrum is discarded if the threshold is exceeded because that indicates that a large amount of the energy of the spectrum comprises strong wide band energy, or other content that is inconsistent with narrowband interference. If such a spectrum were included in the computations made to generate the tap weights, instead of being discarded, it could result in corrupting the narrow band interference spectrum estimate, and therefore the tap weights.

Figures 9, 10:
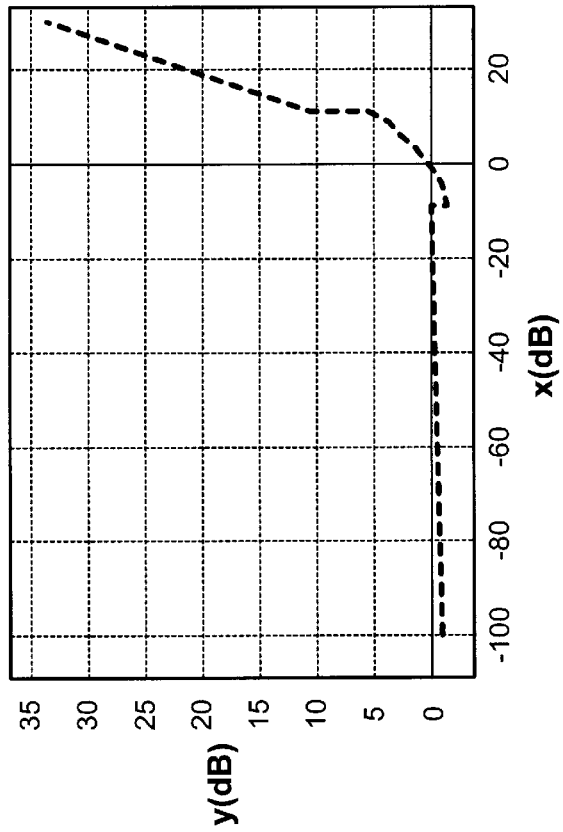
FIG. 9 is a table of modes used in connection with a spectral mask incorporated in the algorithm of FIG. 7B.
FIG. 10 is a diagram illustrating a non-linear function used in connection with the tracker of the filter weight computation algorithm of FIG. 7B.

If the sum passes the threshold test, the spectrum is then introduced to a maximum-hold tracking filter represented by a block 32, which tracks the changes in the interference with different time constants. This tracking filter maintains an upper bound (with leak) on each frequency bin, over multiple input spectra, i.e., multiple blocks of input samples. Preferably, the tracking filter implements a fast-attack, slow-decay function, or a leaky maximum-hold function, depending on the parameters of the error gain function f(x) applied by filter 32. As illustrated in FIG. 10, the error gain function f(x) is preferably a nonlinear function with a high gain for large positive errors, thereby causing it to rapidly increase when a new narrow band interference source appears, and a very low gain for large negative errors, so that the spectrum estimate remembers an interfering signal for a period of time after the narrow band interference disappears. Therefore, in the case of intermittent narrow band interference at a given frequency, the filter does not require significant retraining every time the narrow band interference reappears. In summary, the tracking filter produces an average of the input spectra taken over different periods of time, depending upon the error gain function.

Preferably, different gain characteristics similar to those shown in FIG. 10 are applied to the frequency bins individually or in groups. For example, eight different characteristics could be used and three control bits could be assigned to each bin in order to select the gain characteristic for that bin. Depending upon the particular interference pattern of the communication channel, the control bits are selected to combat the interference. The output of the tracking filter block 32 is then applied to a frequency mask represented by a block 44, where a user-defined spectrum mask may be applied to cancel selected frequency bins of the filtered spectrum leaving the tracking filter.

Each of the frequency bins of the mask has associated with it two mode bits, designating how the mask and the spectrum are to be combined. (See FIG. 9.) The user-defined mask may indicate the presence of overlapping, adjacent-channel energy, or a known, narrowband interferer, or the like. The spectrum of the permanent energy spectrum of the channel can be monitored either by a human observer or automatically by spectrum analysis and intelligent computer algorithms, to identify for example adjacent overlapping channel energy or known interference sources; the mask cancels these unwanted energy components in a flexible way based on the selected mode. The user may select from a number of different modes of combining the inputs to block 44 on a bin by bin basis. For example, the input spectrum could be used en toto and the mask disregarded; the mask could be used en toto and the input spectrum disregarded; the larger of the input spectrum or the mask could be used or the sum of the input spectrum and the mask in dB could be used. Each combining method is selected independently from bin to bin.

The noise floor of the spectrum is also adjusted according to the present invention in mask block 44. Such noise floor alteration was described with reference to FIGS. 5 and 6 and, while performed by block 44 of FIG. 7B, may be performed within or adjacent to tracker block 32. The concept of an SNR goal is used to determine how high the noise floor should be in a robust design. For example, for a communications system that uses uncoded 16-QAM modulation, a goal of 20 dB is required for good bit error rate (BER) performance. If the thermal noise floor is very low, for example if 30 dB energy per symbol to noise density ratio (Es/No) is available, then it is not necessary to null out the narrow band interference all the way down to the white noise floor. For example, a 0 dBc interferer only needs to be nulled by a little over 20 dB, not by 30 dB. In this example, one would raise the noise floor by approximately 10 dB.

The noise floor of the spectrum is raised to the SNR goal for the following reasons:

It tends to make the numerical computations of the filter coefficients more robust.

It helps whiten the noise floor, de-emphasizing small peaks that may have been caused by the tracking filter.

It tends to reduce the size of the ICF tap weights, which is desirable from the standpoints of demodulator tracking and DFE error propagation.

In adjusting the noise floor via mask block 44 operations, the spectrum is processed to find those frequency bins that correspond to interference peaks, and those that comprise a noise floor. One way to perform this processing is by simple comparison with a threshold. Another way (preferred) is by sorting the spectrum into peaks and floor on a bin by bin basis. The floor bins are averaged in dB and adjusted to produce the desired SNR goal. The spectrum intensity in these noise floor bins (those below the threshold) is then further adjusted to the point where the budgeted SNR goal of the communication system is just met. It is assumed in this discussion that the spectrum being processed contains higher SNR than the SNR goal; if not, insufficient margin exists and the noise floor may not be beneficially raised.

After application of the mask and raising of the noise floor, the spectrum is converted to its anti-log and the inverse FFT function is performed on the output of block 44 to return to the time domain as represented by an autocorrelation block 46. If n is the number of taps in FIR filter 14, the first n time bins of the IFFT at the output of block 46 are used to produce the coefficients of the taps of filter 14. After computation of the tap weights and comparison with constraints, it is determined if further modifications to the noise floor should be made; this is addressed in FIGS. 8, 11, and 12. If further changes in the noise floor are needed, then, as represented by R(0) adjust block 48, these changes may be accomplished via adjustment of the R(0) term of the autocorrelation function, which is output by block 46.

The noise floor from block 48 and the first n−1 time bins of the IFFT are supplied to a prediction algorithm for computing prediction coefficients as represented by a block 52. The prediction coefficients are based on past spectrum values. The prediction algorithm could be a standard algorithm for predicting a stationary time series from the finite past (such as the Trench algorithm discussed herein below). The filter coefficients computed by the prediction algorithm of block 52 are tested against three tap constraints represented by a block 50. If the constraints are not satisfied, an adjustment is made to R(0) by block 48 until the prediction coefficients do fall within the constraints. It may also be necessary to recompute the prediction coefficients with a constraint imposed. The prediction coefficients are inverted in polarity and used as the ICF tap weights for FIR filter 14 (FIG. 1B).

The R(0) adjust of block 48 can be used to establish an artificial noise floor for the algorithm. In such case, the R(0) adjust in essence simulates noise that either augments or reduces the actual noise on the communication channel and the algorithm responds accordingly to calculate ICF tap coefficients that have a built in positive or negative margin.

Figure 11:
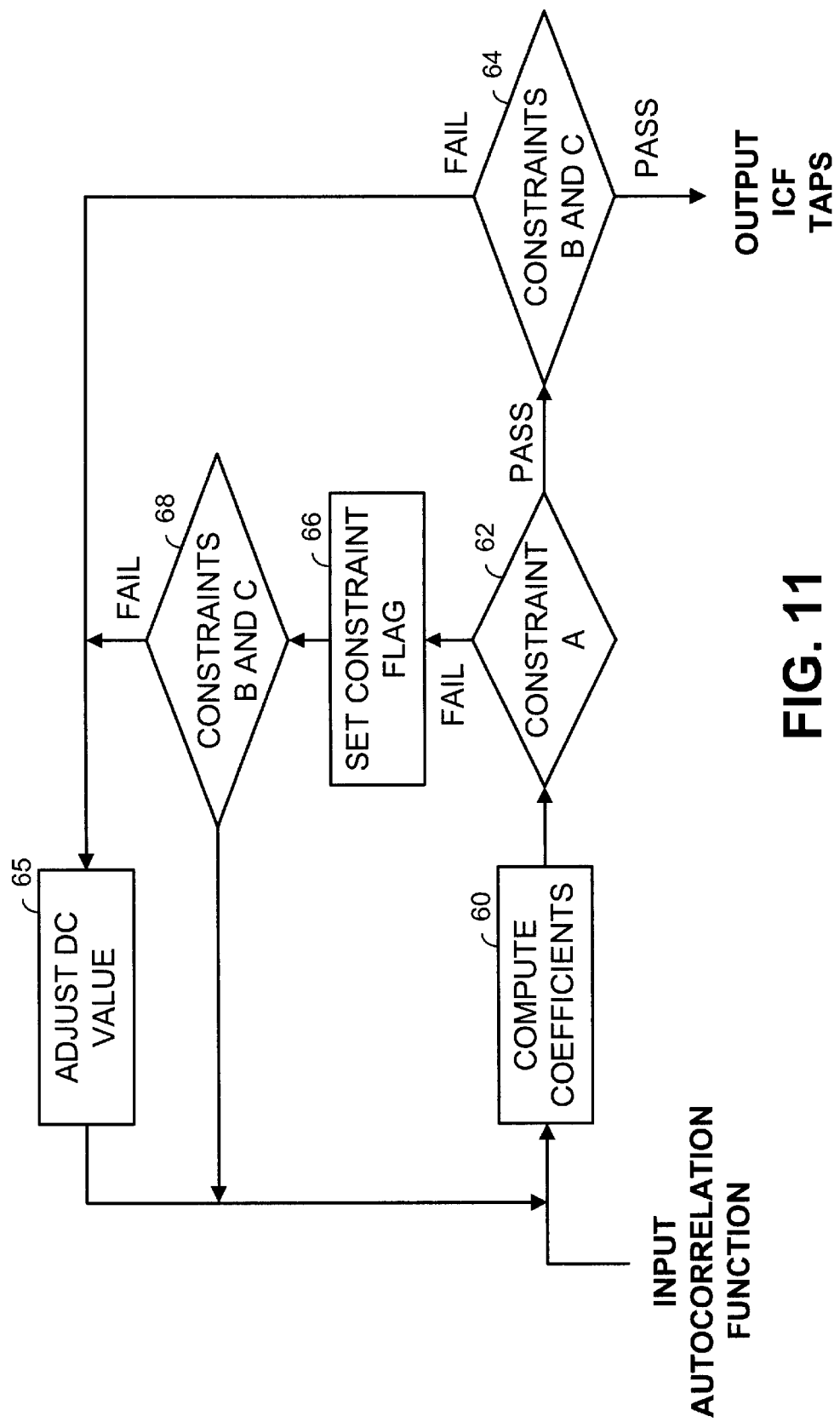
FIG. 11 is a flow diagram depicting a noise floor setting algorithm for the filter weight computation algorithm of FIG. 7B.

An algorithm shown in FIG. 11 carries out the constraints represented by block 52. The autocorrelation function produced by autocorrelation block 46 is processed by a step represented by a block 60 using the predictive algorithm of block 50 to compute an initial set of ICF tap weights to be tested by the constraints. The ICF tap weights resulting from block 60 are compared with a constraint A at query block 62. In one embodiment, constraint A is that the lowest order tap magnitude be smaller than 0.25.

If constraint A is satisfied, i.e., passes, then the operation proceeds to a query block 64, where the process determines whether constraints B and C are satisfied. In one embodiment, constraint B is that the sum of the tap magnitudes is smaller than 3, and constraint C is that the absolute values of the real and imaginary parts of all prediction taps (I and Q) is less than 2.

If both constraints B and C are also satisfied, then the ICF taps are output and the algorithm is finished. If one or both are not satisfied, i.e., fail, however, then operation proceeds to a step 65, and the R(0) value of the autocorrelation function is adjusted. This adjustment changes the input autocorrelation function. Operation then proceeds back to the step represented by block 60 to recompute the prediction coefficients and repeat the described steps.

However, if at query block 62 constraint A is not satisfied, then the operation proceeds to a step 66 and a constraint flag is then set, which from then on results in the invocation of a constrained algorithm, which incorporates the magnitude of the first tap as a constraint on the solution. Operation then proceeds to a query block 68, where the process determines whether constraints B and C are satisfied. If so, then the operation proceeds back to the step represented by block 60 to recalculate the prediction coefficients using the constraint.

If at query block 68 one or both of constraints B and C are not satisfied, then operation proceeds to a step 65, the R(0) value is adjusted, and operation then proceeds back to step 60.

In one embodiment of the invention, an iteration limit is enforced on the number of times the prediction coefficients are computed pursuant to block 60. For example, the prediction coefficients may be computed up to five times in an effort to satisfy the three constraints. If after the selected number of iterations, the constraints are still not satisfied, then the previous ICF tap weights are allowed to persist.

Figure 12:
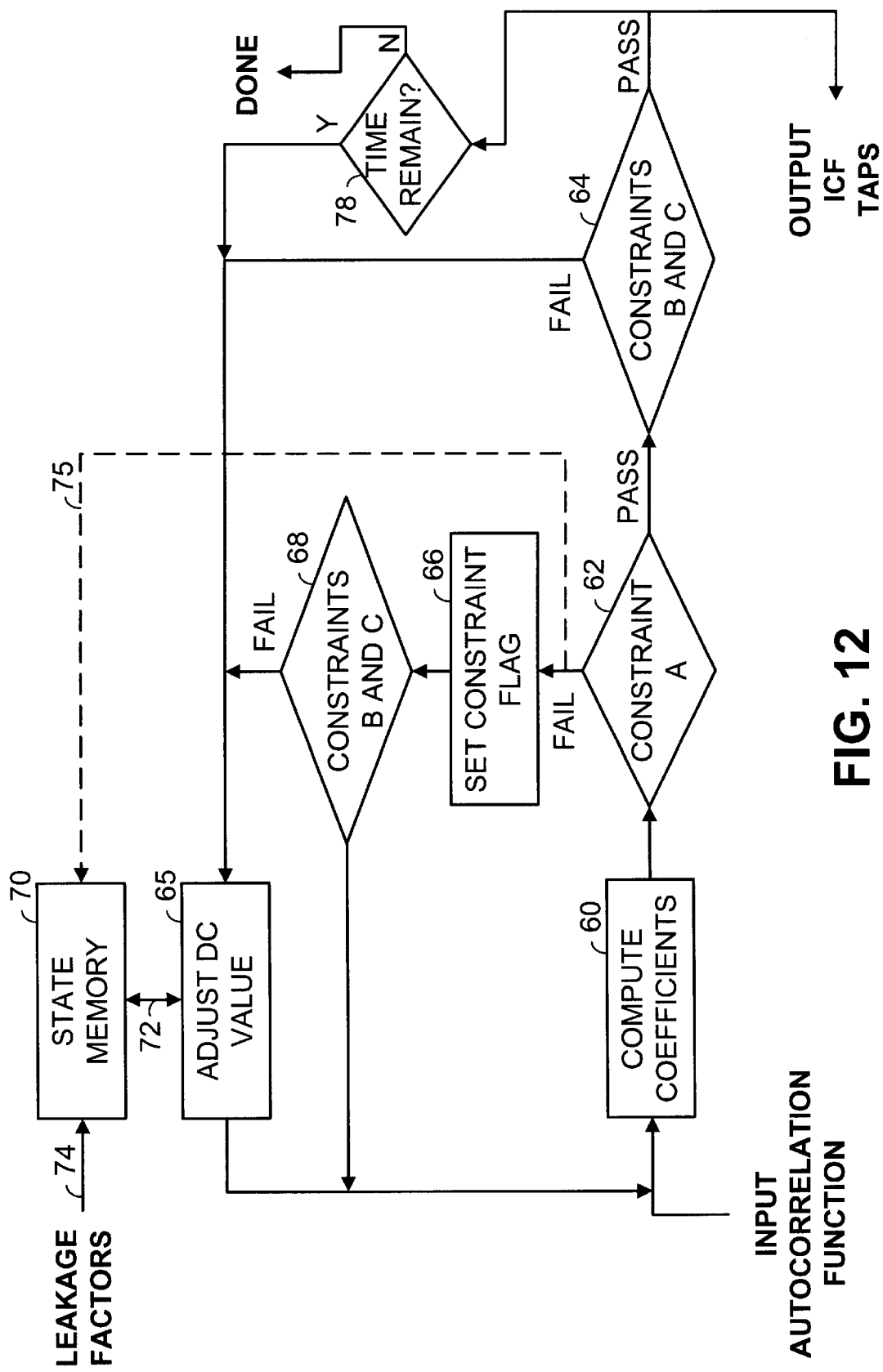
FIG. 12 is a flow diagram depicting a modified noise floor setting algorithm for the filter weight computation algorithm of FIG. 7B.

In a further improvement, rather than beginning the design iteration cycle of FIG. 11 afresh with each updated spectrum estimate, a means of incorporating information from previous designs is employed to shorten time required to calculate the prediction coefficients. This is shown in FIG. 12, in which the results of the initial tap weight computation, together with the results of the initial computation and last computation of the previous design, are used to determine the parameters for the second computation of the current design. The previous design refers to the final ICF taps output from block 64 after the last calculation and the current design refers to the ICF taps being derived in the course of the present calculation.

In FIG. 12, the elements used in the algorithm of FIG. 11 are assigned the same reference numerals. In one embodiment, a state memory 70 stores the following state variables from the previous design (filter setting generation operation):

Whether constraint A failed on $1^{st}$ iteration of previous design.

Whether constraint A failed on any iteration of previous design.

First R(0) adjustment of previous design.

Cumulative R(0) adjustment predicted by previous design for use in current design.

These state variables, or other selected suitable variables used in the algorithm, are taken into account in computing the R(0) adjustment of the current design, as represented by a double ended arrow 72 between blocks 70 and 65. In addition, a leakage factor is included in the memory characteristics of state memory 70, as represented by an arrow 74. The leakage factor determines the weighting given to the past values of the variable relative to the present values of the variables. If the leakage factor is zero, the past has no influence, i.e., it is ignored. If the leakage factor is unity, the influence from the past is fully weighted. Normally a value slightly less than unity is used for the leakage factor. As represented by a broken line arrow 76 and arrow 72 to state memory 70, the state variables are transmitted to state memory 70.

In a further improvement of the algorithm of FIG. 11, as represented in FIG. 12, by a query block 78, the iterations continue as time permits, further refining the noise floor/R(0) value. The R(0) value may be further increased or reduced. For example, there may be time for three iterations of the algorithm of FIG. 11 before the arrival of a new spectrum estimate. The algorithm may initially adjust the noise floor on the first iteration by a large amount for maximum convergence speed. The second iteration will then meet the constraints with excess margin. This will lead to a lowering of the noise floor on the third iteration, which as a result may or may not satisfy the constraints. The next design can then benefit from the previous design. In this fashion, a design satisfying a new interference spectrum can be found and applied quickly. The most recent design that passed the constraints is the one to use in the ICF. Iterations that are more recent, but did not pass the constraints, or did not complete due to lack of time, are not used. However, the most recent iteration, regardless of whether it passed the constraints, is stored in the state memory for use by the next design.

First, an initial unconstrained computation is performed in the manner described in FIG. 11. The results of this initial tap weight computation, together with the results of the initial computation and last computation of the previous design, are used to determine the parameters for the second computation of the current design. For example, in one embodiment there may be time for three iterations of FIG. 11 before the arrival of a new spectrum estimate. The algorithm may initially adjust the noise floor on the first iteration by a large amount for maximum convergence speed. The second iteration will then meet the constraints with excess margin. This will lead to a lowering of the noise floor on the third iteration, which as a result may or may not satisfy the constraints. The next design can then benefit from the previous design. In this fashion, a design satisfying a new interference spectrum can be found and applied quickly.

The unconstrained algorithm employed to compute the filter settings is described in a paper: William F. Trench, "Weighting Coefficients for the Prediction of Stationary Time Series From the Finite Past," SIAM Journal of Applied Math, Vol. 15, No. 6, November 1967, pp 1502–1510 (Hereinafter "Trench", "Trench paper" and/or "Trench operations").

In using the Trench operations, it is necessary to begin with the autocorrelation function of the process which is to be predicted (i.e., predicted and then canceled in our application) when designing prediction taps using the Trench operation equations. We develop an estimate of the desired autocorrelation function in our ICF processing by inverse Fourier transforming the power spectrum of the ingress (tracked, masked, and otherwise processed to be made most suitable for noise canceling). When N taps are to be used in the prediction (or canceling) filter, plus the initial or feed-through tap, then the autocorrelation function is needed for displacements of zero to N, i.e., R(n), n=0 to N.

In the traditional case of designing prediction taps using the equations from Trench, the recursion formulae presented in Trench's Theorem 1 suffice, and the N+1 values of the autocorrelation function are all that is necessary as input to the recursions.

In the case of the constrained first tap magnitude operations, however, the traditional design procedure is not sufficient. If one design of the prediction taps is completed in the traditional way, and it is found that the first tap magnitude is larger than desired (constraint A), for whatever reason, then a remedy for this situation is as follows. Assume that the first tap in the prediction filter just derived is given as $P_1$, and that it is desired to limit its magnitude to p1_limit. We then desire to find the best values for the remaining prediction taps, $p_2$ to $p_N$, given that the first tap now must be constrained.

We call upon Theorem 2 in Trench to solve this more difficult problem than the original, unconstrained design. As in the traditional unconstrained design, we use our autocorrelation function, R(n), n=0 to N, as the input to the recursions of the reference. Our autocorrelation function R(n) is used to define the autocorrelation matrix $\Phi_{r-s}$, for r,s=0 to N−1, of Reference 1, in the traditional unconstrained design.

To accommodate the constrained design, we make the following modifications:.

1. In Equation 9 of the Trench paper, we now define the matrix $\Phi_{r-s}$, for r,s=0 to N−2, using R(n), n=0 to N−2. Further, in Equation 9 of Reference 1, we define $\eta_r$, for r=0 to N−2, as $$\eta_k = R(k+2) - [R(k+1)p_1/|p_1|][p1\_\text{limit}], k=0 \text{ to } N-2.$$

2. Then, the recursions of the Trench paper, Theorem 2, are carried out.

3. After completing the recursions of the Trench paper, the solution to Equation 9 is developed, and is denoted in the reference as $\xi_{0m}, \xi_{1m}, \ldots \xi_{mm}$, where we have m=N−2 in our constrained case here.

4. The prediction tap coefficients for this constrained tap design case are then $$p_{1,constrained} = [p_1/|p_1|][p1\_\text{limit}];$$

$$p_{n,constrained} = \xi_{n-2,N-2}, \text{ for } n=2 \text{ to } N.$$

5. The N values $p_{n,constrained}$, n=1 to N, constitute the N coefficients for the desired prediction filter. Note that since noise canceling is our desire, the additive inverse of these coefficients is used in the ingress canceling filter. These operations conclude one embodiment of the constrained algorithm.

Figure 8:
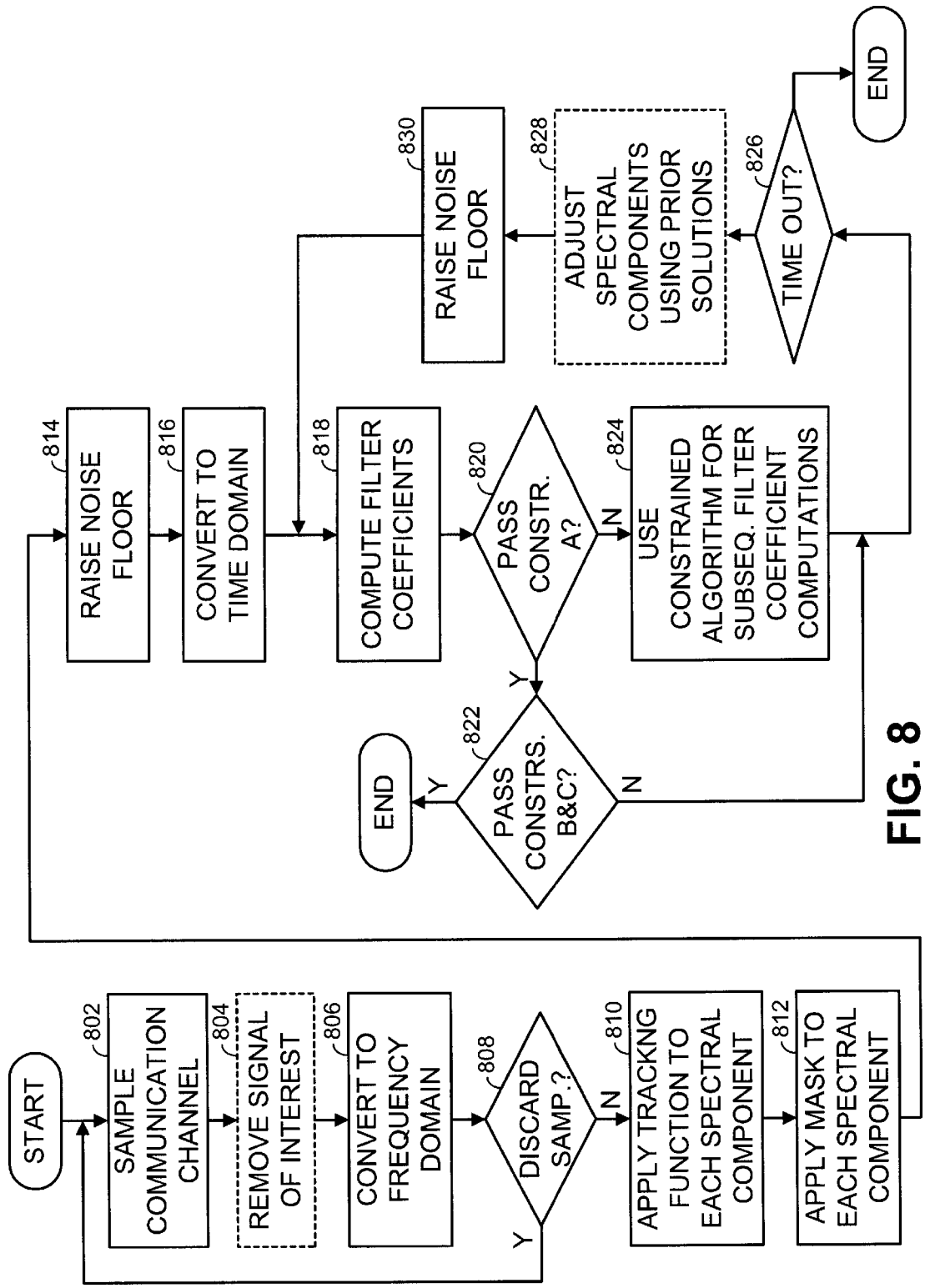
FIG. 8 is a logic diagram illustrating operations performed corresponding to the filter weight computation algorithm of FIG. 7B.

FIG. 8 is a logic diagram illustrating operations performed corresponding to the filter weight computation algorithm of FIG. 7B in a different manner. The operations of FIG. 8 are performed for each sampling interval. Operation commences by sampling the communication channel to produce the sampled signal (step 802). If the communication channel is sampled while a signal of interest (desired signal) is present, the signal of interest is removed from the sampled signal (step 804). The sampled signal is then converted to the frequency domain to produce a spectral characterization of the sampled signal (step 806). An example of such a spectral characterization is illustrated in FIG. 5.

The spectral characterization of the sampled signal is then compared to a threshold to determine whether the sampled signal is valid (step 808). One particular technique for performing this determination was described with reference to block 30 of FIG. 7B. If the spectral characterization is discarded, the operation of FIG. 8 for the particular sampled signal is complete and operation returns to step 802 wherein the communication channel is sampled during the next sampling interval.

If the spectral characterization is valid, one or more tracking functions are applied to each spectral component of the spectral characterization (step 810). Then, the user mask is applied to each spectral component (step 812). These operations were described in detail with reference to FIG. 7B. Next, the noise floor of the spectral characterization is raised to a budgeted SNR (step 814). This operation was described with particular reference to FIGS. 5, 6, and 7B. All of these operations of step 810, 812, and 814 are performed in the frequency domain. The result of these operations is the production of a modified spectral characterization. The modified spectral characterization is then converted to the time domain (step 816).

With the modified spectral characterization in the frequency domain, a first set of filter coefficients for the sample interval is computed (step 818). This operation may be performed according to the Trench paper. With the filter coefficients determined, a determination is made as to whether constraint A is passed (step 820). In the described embodiment, constraint A is passed if the first tap coefficient magnitude (after monic tap) is less than 0.25. If constraint A is passed, the filter coefficients are compared to constraints B and C. In the described embodiment, constraint B considers whether the sum of the tap magnitudes is less than 3.0 and constraint C considers whether the max tap I or Q component is less than 2.0. If all of these constraints are met at steps 820 and 822, the filter taps are applied to FIR filter 14 of FIG. 7A.

If, however, constraint A is not met, all subsequent filter coefficient determination is performed using the constrained algorithm described above herein (block 824) and operation proceeds to decision block 826. If constraint A is met but constraints B and/or C are not met, operation proceeds to decision block 826 but the unconstrained algorithm continues to be employed. If a time out condition has occurred at decision block 826, e.g., four iterations, actual time constraint, etc., operation ends without determination of new filter coefficients. In such case, a previous set of filter coefficients are employed.

If the time out condition of decision block 826 has not occurred, the modified spectral characterization and/or filter tap settings produced may be modified using prior operations/prior solutions (block 828). Then, the noise floor is adjusted (block 830) and either the unmodified or the modified algorithm is employed to compute again the filter coefficients (block 818). The operations of FIG. 8 will continue to be performed for the current sample until either a solution is produced or a time out condition is met.

Figure 13:
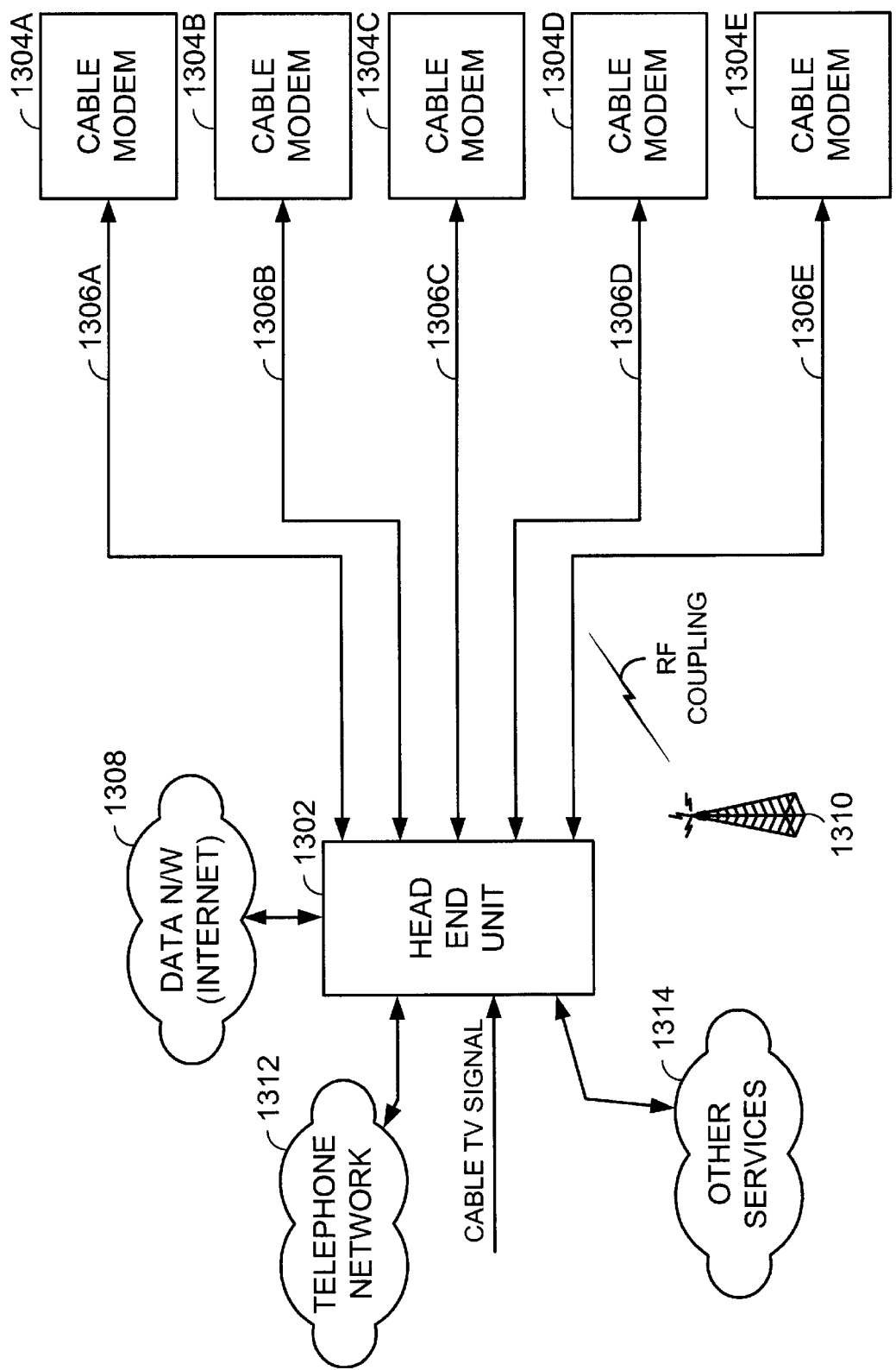
FIG. 13 is a system diagram illustrating the manner in which the present invention may be employed in a cable telecommunication system servicing high speed data communications.

FIG. 13 is a system diagram illustrating the manner in which the present invention may be employed in a cable telecommunication system servicing high speed data communications. In the cable telecommunication system, a head end unit 1302 couples to a plurality of cable modems 1304A–1304E via respective cable media 1306A–1306E. The head end unit 1302 services high 20 speed data communications for the plurality of cable modems 1304A–1306E by acting as a gateway to a data network, such as the Internet 1308, a telephone network 1312, or other services network 1314. The head end unit 1302 also acts to distribute cable TV signals via the cable media 1306A–1306E to TV set top boxes (not shown). These cable TV signals therefore share the cable media 1306A–1306E with the high speed data communications also serviced by the head end unit 1302.

The head end unit 1302 services the high speed data communications within a frequency band of interest. Interfering signals may reside within this frequency band of interest. Once source of these interfering signals may be radio frequency (RF) coupled from an RF source 1308. HAM radio operators, for example, produce radio frequency emissions in the frequency band of interest that may couple to the cable media 1306A–1306E as interfering signals. RF coupled interfering signals are typically intermittent. However, some interfering RF signals may be predicted. Further, the cable system itself may produce interfering signals via adjacent channel interference or via infrastructure components that operate in a faulty manner. These signals may be intermittent or may be somewhat continual, depending upon the cause of the interfering signals.

Thus, according to the present invention, the head end unit 1302 and/or the cable modems 1304A–1304E employ the filtering operations of the present invention to remove the interfering signals from the communication channel serviced by the cable media 1306A–1306E. By performing these operations, the communication channel will service data communications at a higher effective data rate, thus increasing the throughput supported by the cable telecommunication system.

In general, the described algorithms could be implemented in software that operates on a special purpose or general-purpose computer or in hardware. If the calculations necessary to compute the filter tap coefficients have not been completed by the next time interval T, the time interval is simply skipped and the algorithms operate on the narrow band interference energy in the following time interval T. With reference to FIG. 87 of application Ser. No. 09/710, 238, filed on Nov. 9, 2000, the invention disclosed in this application comprises notch filter adjusting block 377.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. The various features of the invention such as verifying the narrow band content, tracking the changes in the narrow band interference with different time constants, and frequency masking could each be practiced separately. For example, after integrating the frequency domain representation of the communication channel upon which the ICF is operating, the ICF coefficients could be computed in the time domain, instead of the frequency domain. Alternatively, the tracking function could be performed on the time domain representation of the communication channel. Furthermore, the features of invention can be practiced in other types of communication channels such as fixed wireless, cable, twisted pair, optical fiber, satellite, etc.

What is claimed is:

1. A method for canceling narrow band interference on a communication channel, the method comprising the steps of:

sampling the communication channel to produce a sampled signal;

spectrally characterizing the sampled signal across a frequency band of interest to produce a spectral characterization of the sampled signal, wherein the spectral characterization does not include a signal of interest;

modifying the spectral characterization of the sampled signal to produce a modified spectral characterization;

generating filter settings based upon the modified spectral characterization;

filtering the communication channel using the filter settings when the signal of interest is present on the communication channel; and wherein in modifying the spectral characterization of the signal to produce the modified spectral characterization, a noise floor of the spectral characterization is raised to meet a budgeted signal-to-noise level.

2. The method of claim 1, wherein in modifying the spectral characterization of the sampled signal to produce the modified spectral characterization, a plurality of spectral characteristics are modified.

3. A method for canceling narrow band interference on a communication channel, the method comprising:

sampling the communication channel to produce a sampled signal;

spectrally characterizing the sampled signal across a frequency band of interest to produce a spectral characterization of the sampled signal, wherein the spectral characterization does not include a signal of interest;

modifying the spectral characterization of the sampled signal to produce a modified spectral characterization;

generating filter settings based upon the modified spectral characterization;

filtering the communication channel using the filter settings when the signal of interest is present on the communication channel; and wherein in modifying the spectral characterization of the sampled signal to produce the modified spectral characterization, spectral components corresponding to an expected interfering signal are modified.

4. A method for canceling narrow band interference on a communication channel, the method comprising:

sampling the communication channel to produce a sampled signal;

spectrally characterizing the sampled signal across a frequency band of interest to produce a spectral characterization of the sampled signal, wherein the spectral characterization does not include a signal of interest;

modifying the spectral characterization of the sampled signal to produce a modified spectral characterization;

generating filter settings based upon the modified spectral characterization;

filtering the communication channel using the filter settings when the signal of interest is present on the communication channel; and wherein in modifying the spectral characterization of the sampled signal to produce the modified spectral characterization, spectral components corresponding to a plurality of expected interfering signals are modified.

5. A method for canceling narrow band interference on a communication channel, the method comprising:

sampling the communication channel to produce a sampled signal;

spectrally characterizing the sampled signal across a frequency band of interest to produce a spectral characterization of the sampled signal, wherein the spectral characterization does not include a signal of interest;

modifying the spectral characterization of the sampled signal to produce a modified spectral characterization;

generating filter settings based upon the modified spectral characterization;

filtering the communication channel using the filter settings when the signal of interest is present on the communication channel;

wherein in modifying the spectral characterization of the sampled signal to produce the modified spectral characterization, spectral components of prior sampled signals are employed; and wherein in considering the spectral components of prior sampled signals in modifying the spectral characterization of the sampled signal to produce the modified spectral characterization, the presence of an interfering signal in a prior sampled signal is weighted more heavily than the absence of the interfering signal in the current sampled signal.

6. The method of claim 1, wherein the frequency band of interest corresponds to the frequency band of the signal of interest.

7. The method of claim 1, wherein the sampling is performed when the signal of interest is not present on the communication channel.

8. A method for canceling narrow band interference on a communication channel, the method comprising:

sampling the communication channel to produce a sampled signal while the signal of interest is present on the communication channel;

spectrally characterizing the sampled signal across a frequency band of interest to produce a spectral characterization of the sampled signal, wherein the spectral characterization does not include a signal of interest;

modifying the spectral characterization of the sampled signal to produce a modified spectral characterization;

generating filter settings based upon the modified spectral characterization;

filtering the communication channel using the filter settings when the signal of interest is present on the communication channel; and removing the signal of interest from the sampled signal.

9. The method of claim 1 wherein modifying the spectral characterization of the sampled signal to produce a modified spectral characterization is performed in the frequency domain.

10. The method of claim 1, wherein modifying the spectral characterization of the sampled signal to produce a modified spectral characterization is performed in the time domain.

11. The method of claim 1, wherein modifying the spectral characterization of the sampled signal to produce a modified spectral characterization is performed both in the frequency domain and in the time domain.

12. A method for canceling narrow band interference on a communication channel, the method comprising:

sampling the communication channel to produce a sampled signal;

spectrally characterizing the sampled signal across a frequency band of interest to produce a spectral characterization of the sampled signal, wherein the spectral characterization does not include a signal of interest;

modifying the spectral characterization of the sampled signal to produce a modified spectral characterization;

generating filter settings based upon the modified spectral characterization;

filtering the communication channel using the filter settings when the signal of interest is present on the communication channel; and discarding the sampled signal when total spectral density of the spectral characterization of the sampled signal exceeds a threshold.

13. A method for canceling narrow band interference on a communication channel with a multi-tap filter, the method comprising:

repeatedly taking samples of the communication channel without signal during an interval of time;

converting the samples taken during the interval of time to a frequency spectrum;

integrating the frequency spectrum;

comparing the integrated frequency spectrum to a threshold value;

if the integrated frequency spectrum is smaller than the threshold value, using the integrated frequency spectrum to compute tap coefficients for the multi-tap filter;

if the integrated frequency spectrum is larger than the threshold value, retaining previously determined tap for the multi-tap filter; and filtering the communication channel with the multi-tap filter using the tap coefficients.

14. A method for canceling narrow band interference on a communication channel with a multi-tap filter, the method comprising:

repeatedly taking samples of the communication channel during intervals of time without signal;

converting the samples taken during the intervals of time to frequency spectra;

storing the frequency spectra so that positive changes from spectrum to spectrum are tracked closely and negative changes from spectrum to spectrum are tracked slowly;

converting the stored frequency spectra to a time domain representation;

computing filter tap coefficients based upon the time domain representation of the stored frequency spectra; and filtering the communication channel with the multi-tap filter using the filter tap coefficients.

15. The method of claim 14, further comprising altering the frequency spectra by raising the noise floor of the frequency spectra.

16. The method of claim 14, additionally comprising the step of converting the frequency spectra to logarithmic values before the storing step.

17. The method of claim 16, additionally comprising the step of converting the frequency spectra to anti-logarithmic values before the step of converting to the time domain representation.

18. A method for canceling narrow band interference on a communication channel with a multi-tap filter, the method comprising:

repeatedly taking samples of the communication channel during intervals of time without signal;

converting the samples taken during the intervals of time to frequency spectra;

applying a frequency mask to the frequency spectra;

converting the masked frequency spectra to a time domain representation;

computing filter tap coefficients based upon the time domain representation; and filtering the communication channel with the multi-tap filter using the filter tap coefficients.

19. The method of claim 18, wherein the frequency mask operates on different portions of the frequency spectra differently.

20. A method for canceling narrow band interference on a communication channel with a multi-tap filter, the method comprising:

repeatedly taking samples of the communication channel during intervals of time without signal;

calculating tap coefficients for the filter from the samples;

comparing the calculated tap coefficients against one or more prescribed constraints;

when the tap coefficients satisfy the prescribed constraints, filtering the communication channel using the calculated tap coefficients; and when the tap coefficients do not satisfy the prescribed constraints, calculating constrained tap coefficients based upon a calculation constraint and filtering the communication channel using the constrained tap coefficients.

21. The method of claim 20, wherein calculating tap coefficients for the filter from the samples further comprises of raising a spectrum noise floor of the samples.

22. The method of claim 20, additionally comprising:

changing a parameter that affects tap coefficient calculation if the one or more constraints are not satisfied;

repeating the calculating, comparing, and changing steps until the one or more constraints are satisfied; and filtering the communication channel using the resulting tap coefficients when the one or more constraints are satisfied.

23. The method of claim 22, wherein changing the parameter that affects tap coefficient calculation includes raising a spectrum noise floor of the samples.

24. The method of claim 23, wherein raising the spectrum noise floor of the samples comprises modifying the R(0) term of a corresponding autocorrelation function.

25. The method of claim 22, in which the repeating step terminates after a given number of repetitions without satisfying some or all of the one or more constraints.

26. The method of claim 22, in which the repeating step terminates after a time limit is met without satisfying some or all of the one or more constraints.

27. The method of claim 22, further comprising repeating the calculating even after the one or more constraints are satisfied to refine the tap coefficients.

28. The method of claim 22, wherein changing the parameter includes using an R(0) component of a corresponding autocorrelation function, and the method further comprises:

retrieving one or more stored prior states of the calculated tap coefficients and adjusting the R(0) component responsive to the retrieved one or more prior states.

29. The method of claim 28, wherein:

the multi-tap filter has a lowest order tap coefficient that is influenced by the R(0) component;

the one or more constraints comprises the lowest order tap coefficient exceeding a threshold value; and the retrieving step comprises retrieving a prior state that indicates whether the lowest order tap coefficient on the last repeating step exceeded the threshold value.

30. The method of claim 29, wherein the retrieving step further comprises retrieving a prior state that indicates whether the lowest order tap coefficient on any repeating step exceeded the threshold value.

31. The method of claim 29, wherein in the retrieving step, a prior initial adjustment to a spectral noise floor of the samples is retrieved.

32. The method of claim 29, wherein in the retrieving step, a final adjustment to a spectral noise floor of the samples is retrieved.

33. A method for canceling narrow band interference on a communication channel with a multi-tap filter, the method comprising:

repeatedly taking samples of the communication channel during intervals of time without signal;

calculating tap coefficients for the filter from the samples;

comparing the calculated tap coefficients against one or more prescribed constraints;

when the tap coefficients satisfy the prescribed constraints, filtering the communication channel using the calculated tap coefficients; and when the tap coefficients do not satisfy the prescribed constraints:
  changing a parameter that affects tap coefficient calculation;
  repeating the calculating, comparing, and changing steps until the one or more constraints are satisfied; and
  filtering the communication channel using the resulting tap coefficients when the one or more constraints are satisfied.

34. The method of claim 33, wherein changing the parameter that affects tap coefficient calculation comprises adjusting a spectrum noise floor of the samples.

35. The method of claim 34, wherein adjusting the spectrum noise floor of the samples comprises modifying the R(0) term of a corresponding autocorrelation function.

36. The method of claim 35, further comprising retrieving a prior state of the calculated tap coefficients and modifying the R(0) term of the corresponding autocorrelation function based upon the prior state.

37. The method of claim 33, wherein changing the parameter includes adjusting a spectrum noise floor of the samples, and the method further comprises:
  retrieving a prior tap coefficient state and adjusting the spectrum noise floor of the samples responsive to the prior tap coefficient state.

38. The method of claim 33, in which the repeating step terminates after a time limit is met without satisfying some or all of the one or more constraints.

39. The method of claim 33, further comprising repeating the calculating even after the one or more constraints are satisfied to refine the tap coefficients.

40. The method of claim 33, wherein changing the parameter includes using an R(0) component of a corresponding autocorrelation function, and the method further comprises:
  retrieving one or more stored prior states of the calculated tap coefficients and adjusting the R(0) component responsive to the retrieved one or more prior states.

41. The method of claim 40, wherein:
  the multi-tap filter has a lowest order tap coefficient that is influenced by the R(0) component;
  the one or more constraints comprises the lowest order tap coefficient exceeding a threshold value; and
  the retrieving step comprises retrieving a prior state that indicates whether the lowest order tap coefficient on the last repeating step exceeded the threshold value.

42. The method of claim 41, wherein the retrieving step further comprises retrieving a prior state that indicates whether the lowest order tap coefficient on any repeating step exceeded the threshold value.

43. The method of claim 41, wherein in the retrieving step, a prior initial adjustment to a spectral noise floor of the samples is retrieved.

44. The method of claim 41, wherein in the retrieving step, a final adjustment to a spectral noise floor of the samples is retrieved.

45. The method of claim 32, further comprising storing at least one parameter concerning the calculation of the tap coefficients for subsequent use.

46. A method for canceling narrow band interference on a communication channel with a multi-tap filter, the method comprising:
  repeatedly taking samples of the communication channel during intervals of time without signal;
  converting the samples taken during the intervals of time to frequency spectra;
  storing the changes in the frequency spectra according to one of a set of input/output functions, different input/output functions of the set of being used to store the changes in different regions of the frequency spectra;
  converting the stored frequency spectra to a time domain representation; and
  imposing a portion of the time domain representation on the filter as tap coefficients.

47. The method of claim 46, in which the input/output functions are non-linear.

48. A method for canceling narrow band interference on a communication channel, the method comprising:
  sampling the communication channel to produce a sampled signal;
  spectrally characterizing the sampled signal across a frequency band of interest to produce a spectral characterization of the sampled signal, wherein the spectral characterization does not include a signal of interest;
  modifying the spectral characterization of the sampled signal to produce a modified spectral characterization by modifying spectral components of the spectral characterization based upon spectral components of spectral characterizations of prior sampled signals;
  generating filter settings based upon the modified spectral characterization; and
  filtering the communication channel using the filter settings when the signal of interest is present on the communication channel.

49. A method for canceling narrow band interference on a communication channel, the method comprising:
  sampling the communication channel to produce a sampled signal;
  spectrally characterizing the sampled signal across a frequency band of interest to produce a spectral characterization of the sampled signal, wherein the spectral characterization does not include a signal of interest;
  modifying the spectral characterization of the sampled signal to produce a modified spectral characterization by modifying spectral components of the spectral characterization based upon spectral components of expected interfering signals that may not be present in the spectral characterization of the sampled signal;
  generating filter settings based upon the modified spectral characterization; and
  filtering the communication channel using the filter settings when the signal of interest is present on the communication channel.

* * * * *

UNITED STATES PATENT AND TRADEMARK OFFICE
CERTIFICATE OF CORRECTION

PATENT NO. : 6,798,854 B2  Page 1 of 1
APPLICATION NO. : 09/878730
DATED : September 28, 2004
INVENTOR(S) : Thomas Kolze et al.

It is certified that error appears in the above-identified patent and that said Letters Patent is hereby corrected as shown below:

Column 17, line 7, in Claim 1: before "signal" insert --sampled--

Signed and Sealed this

Twelfth Day of August, 2008

JON W. DUDAS
*Director of the United States Patent and Trademark Office*